(12) United States Patent
Livneh et al.

(10) Patent No.: US 12,278,885 B2
(45) Date of Patent: Apr. 15, 2025

(54) SYSTEM AND METHOD FOR SPARSE DATA SYNCHRONIZATION AND COMMUNICATION

(71) Applicant: QUANT L R LTD., Jerusalem (IL)

(72) Inventors: Nitzan Livneh, Mevasseret Zion (IL); Hagai Shmuel Eisenberg, Jerusalem (IL)

(73) Assignee: HEQA SECURITY LTD, Maccabim-Re'ut (IL)

( * ) Notice: Subject to any disclaimer, the term of this patent is extended or adjusted under 35 U.S.C. 154(b) by 387 days.

(21) Appl. No.: 17/948,721

(22) Filed: Sep. 20, 2022

(65) Prior Publication Data

US 2023/0026148 A1 Jan. 26, 2023

Related U.S. Application Data

(63) Continuation-in-part of application No. PCT/IL2021/050322, filed on Mar. 22, 2021.

(Continued)

(51) Int. Cl.
*H04L 7/00* (2006.01)

(52) U.S. Cl.
CPC .......... *H04L 7/0079* (2013.01); *H04L 7/0075* (2013.01)

(58) Field of Classification Search
CPC ..................... H04L 7/0079; H04L 7/0075
See application file for complete search history.

(56) References Cited

U.S. PATENT DOCUMENTS

2012/0105930 A1 5/2012 Yamamoto
2012/0294625 A1* 11/2012 Dynes .................. H04L 9/0852
398/155

(Continued)

FOREIGN PATENT DOCUMENTS

CN 101040482 A 9/2007
CN 110213040 B 7/2020

(Continued)

OTHER PUBLICATIONS

Mink, Alan, "Programmable instrumentation and gigahertz signaling for single-photon quantum communication systems", Apr. 2009, New Journal of Physics, All pages (Year: 2009).*

(Continued)

*Primary Examiner* — Pranesh K Barua
(74) *Attorney, Agent, or Firm* — CANTOR COLBURN LLP

(57) ABSTRACT

Techniques, methods and system, for synchronization of sparse data signals are disclosed, comprising mixing a serial stream of sparse data signals with a serial stream of synchronization signals, to thereby add redundancy to the serial stream of sparse data signals and enable clock regeneration from a serial stream of mixed signals produced by said mixing, emulating the serial stream of synchronization signals by applying the clock regeneration to the serial stream of mixed signals, and generating a stream of parallel synchronization signals having a frequency of the serial stream of synchronization signals, deserializing the serial stream of mixed signals into a stream of parallel mixed signals having a data rate lower than a data rate of the serial signal streams, and demixing the stream of parallel synchronization signals with the stream of parallel mixed signals and thereby removing the redundancy introduced by the mixing into the sparse data signals and generating a parallel stream of (Continued)

demixed signals substantially synchronized with said synchronization signals.

35 Claims, 6 Drawing Sheets

Related U.S. Application Data

(60) Provisional application No. 62/993,097, filed on Mar. 23, 2020.

(56) References Cited

U.S. PATENT DOCUMENTS

| | | | |
|---|---|---|---|
| 2012/0294635 A1 | 11/2012 | Dynes | |
| 2013/0163759 A1* | 6/2013 | Harrison | H04L 9/0819 380/268 |
| 2016/0134420 A1* | 5/2016 | Guinnard | H04L 9/0852 380/278 |
| 2022/0368429 A1* | 11/2022 | Sivan | H04L 7/0087 |

FOREIGN PATENT DOCUMENTS

| | | | |
|---|---|---|---|
| EP | 3920608 A1 | 12/2021 | |
| EP | 3993312 A1 | 5/2022 | |
| JP | 2007288694 A | 11/2007 | |
| WO | 2012105930 A2 | 8/2012 | |

OTHER PUBLICATIONS

International Search Report for corresponding application PCT/IL2023/051022; mail date Jan. 3, 2024.

Alan Mink, "High Speed Quantum Key Distribution System Supports One-Time Pad Encryption of Real-Time Video", Presented at the SPIE Defense & Security Symposium, Orlando, FL, Apr. 17-21, 2006, vol. 6244-22, Session 4.

Alan Mink, "Programmable instrumentation and gigahertz signaling for single-photon quantum communication systems", New Journal of Physics 11 (2009) 045016 (14pp).

International Preliminary Report on Patentability for corresponding application PCT/IL2021/050322 filed Mar. 22, 2021; Mail date Aug. 9, 2022.

International Search Report for corresponding application PCT/IL2021/050322 filed Mar. 22, 2021; Mail date Jun. 30, 2021.

J. C. Bienfang, "Quantum key distribution with 1.25 Gbps clock synchronization", May 3, 2004 / vol. 12 No. 9 / Optics Express 2011.

Written Opinion for corresponding application PCT/IL2021/050322 filed Mar. 22, 2021; Mail date Jun. 30, 2021.

* cited by examiner

SYSTEM AND METHOD FOR SPARSE DATA SYNCHRONIZATION AND COMMUNICATION

TECHNOLOGICAL FIELD

The present application is generally in the field of synchronization and communication of sparse data transmission, such as in single-photon quantum communication applications.

BACKGROUND

This section intends to provide background information concerning the present application, which is not necessarily prior art.

A standard telecommunication transceiver can detect signals of rates higher than 25 Gbps, which means that it can measure events (e.g., bit arrival) within time intervals shorter than 40 ps. The synchronization task (accurate time slot assignment of the received signals) in such standard communication systems is relatively simple because the intensity of the communicated signals is typically strong and easily detected by the receiver, which can be used to regenerate the clock signal of the transmitter (Tx) and operate the receiver (Rx) at the same clock frequency of the transmitter.

Accordingly, utilizing such standard communication systems to implement an event timing system requires provision of a balanced stream of data from the transmitter to the receiver, in order to enable proper clock data recovery (CDR) functionality of the receiver, and reduction of the received data rate (also referred to herein as data speed conversion e.g., as carried out by a serializer/deserializer—SERDES) for data processing and analysis. If, however, this condition cannot be maintained, the synchronization between the transmitter and receiver is lost.

For example, in quantum communication applications (e.g., quantum key distribution—QKD), wherein data is encoded on single-photons (qubits), the received signals are extremely weak due to detector limitations and losses in the optical medium and the receiver. Therefore, the number of signals detected at the receiver is substantially smaller than the number of single-photon signals transmitted by the transmitter. This means that the CDR and SERDES functionalities of standard receivers cannot be performed due to the sparsity of the detected quantum signals, which impose a challenge in measuring (receiving) sparse data signals. Measuring the timing of sparse events, which is known as "time to digital conversion" (TDC), or "time tagging", is useful in many fields of science and technology that involves sparse signals.

Maintaining synchronization between the transmitter (Tx) and receiver (Rx), so that both parties can agree which is the 'i'th bit is crucial for QKD key generation procedures. Moreover, when time-bin encoding is used, the information is carried in the single-photon arrival time, so inaccurate timing between the transmitter and the receiver will cause a high error rate.

A QKD transmission method is disclosed in International Patent Publication No. WO 2012/105930, wherein a transmission list is generated for a plurality of data bits. The transmission list comprises a randomized timing schedule defining respective times for transmission of the data bits, providing a clock signal and using the clock signal to initiate the transmission of the data bits at a predetermined time in order to provide a QKD signal, and an apparatus therefor.

US Patent Publication No. 2012/294625 discloses a communication system comprising an emitter of weak light pulses, a detector which is capable of detecting single photons, and a source of a clock signal, wherein said emitter and detector are synchronized using said clock signal. The system further comprising a frequency divider for said clock signal to produce a reduced frequency clock signal and a clock regenerator for regenerating the original clock signal from the reduced frequency clock signal. The system further comprising a communication channel configured to communicate the clock signal between the emitter and detector, the clock signal being reduced before sending through the channel and reconstructed after it has exited the channel.

US Patent Publication No. 2016/134420 discloses system and methods for synchronizing and aligning quantum channel for Quantum Key Distribution, to allow a Quantum Key Distribution (QKD) apparatus to work continuously with only two communication channels, a quantum communication channel and a service channel. This is achieved by linking the clock frequencies of both channels and completed by an over-sampling method for phase synchronization tracking. Clock signal carry is done through data using clock data recovery encoding techniques. Having a continuous operating QKD system is not possible without a tracking system that enables phase alignment. This synchronization and alignment system and method for QKD has multiple benefits as it allows real-time synchronization with continuous data flow and is not dedicated to a specific quantum protocol.

Mink Alan et al, ("*High-speed quantum key distribution system supports one-time pad encryption of real-time video*", https://www.spiedigitallibrary.org/conference-proceedings-of-spie on 21 Feb. 2021) describe a high-speed quantum key distribution (QKD) test bed incorporating both free-space and fiber systems. These systems demonstrate a major increase in the attainable rate of QKD systems: over two orders of magnitude faster than other systems.

J. C. Bienfang et al, ("*Quantum key distribution with 1.25 Gbps clock synchronization*", Vol. 12 No. 9, OPTICS EXPRESS 2011) demonstrate exchange of sifted quantum cryptographic key over a 730 meter free-space link at rates of up to 1.0 Mbps, two orders of magnitude faster than previously reported results, where a classical channel at 1550 nm operates in parallel with a quantum channel at 845 nm, clock recovery techniques on the classical channel at 1.25 Gbps enable quantum transmission at up to the clock rate.

Alan Mink et al, ("*Programmable instrumentation and gigahertz signaling for single-photon quantum communication systems*", New Journal of Physics 11, 2009) describe custom time-tagging instrumentation for high-speed single-photon metrology, focusing particularly on implementations that can tag and process detection events from multiple single-photon detectors with sub-nanosecond timing resolution and at detection rates above 100 MHz. The disclosed systems view the detector signal as if it were a serial data stream, tagging events according to the bit period in which a rising edge from the detector occurs. Sub-nanosecond resolution with serial data receivers operating up to 10 Gb $s^{-1}$ are reported. Data processing bottlenecks are avoided with pipelined algorithms and controlled data flow implemented in field programmable gate arrays.

GENERAL DESCRIPTION

Clock regeneration and data speed conversion functionalities of conventional transceivers are not designed to handle sparse data communication streams. Therefore, sparse data communication systems typically requires specially designed and expensive circuitries for clock synchronization and data recovery, which complicates the system development and production, and entails increased costs. The present disclosure provides sparse data communication solutions utilizing readily available/nonspecialized off the shelf circuitries/devices, to thereby alleviate design requirements and production costs of sparse data communication systems.

A key feature of the present application is the use of manipulating circuitry to introduce reversible redundancy to the data signals received over a sparse data communication channel, and thereby enable use of the functionality of standard transceiver device(s) for clock regeneration (e.g., frequency locking by CDR of the transceiver) and data speed conversion (e.g., by SERDES of the transceiver), for converting the received high speed serial sparse signal stream into a lower rate parallel signal stream, for processing and analysis. Preferably, in some embodiments, the redundancy introduced to the sparse serial data is derived from synchronization signals (e.g., a pseudo random binary sequence—PRBS) indicative of a clock signal used by the transmitter of the sparse data signals.

For example, the transmitter can send the synchronization signals to the receiver over a separate communication channel (e.g., conventional optical channel using optical fibers, RF channel, or over electric cables). The receiver can be accordingly configured to receive the synchronization signals (e.g., by a small form-factor pluggable—SFP module) from the transmitter, and reversibly mix/combine the received synchronization signals with the received sparse serial data signals. Alternatively, or additionally, an external synchronization signal source can be used by the receiver to introduce the redundancy to the sparse serial data signals. Optionally, an internal synchronization signal source generated in the receiver is used to introduce the redundancy to the received sparse data, with or without an external synchronization signal source.

The synchronization signals used to introduce the redundancy into the received sparse data signals can comprise clock signals having the frequency and periodicity of the clock signal used by the transmitter to transmit the sparse data signals. This way the CDR functionality of a conventional transceiver can be used at the receiver for frequency locking to frequency of an external system, and SERDES of the transceiver can be used for data speed conversion, by producing from the received mixed high speed serial signal stream a lower speed parallel signal stream. Optionally, but in some embodiments preferably, the clock signal of the synchronization signals comprises a PRBS.

Similarly, if external synchronization signals are used, the synchronization signals can comprise a clock signal that both the transmitter and the receiver lock their frequency to, and convert (e.g., by a phase-locked loop—PLL circuitry) to the correct working frequency, and thereby communicate without requiring an additional (conventional) communication channel.

In a possible embodiment the receiver is configured to locally generate the synchronization signals, and use the same to introduce the redundancy to the received sparse data signals for the operation of the transceiver. In this embodiment the initial timing of sparse data signals transmission can be obtained using an internal accurate clock device (e.g., global positioning system—GPS clock), or utilizing another synchronization signal from an external source, or communicated between the transmitter and the receiver on the sparse data communication channel e.g., by transmitting to the receiver a higher intensity optical signal for detection without single photon detectors, from the transmitter to the receiver or from the receiver to the transmitter.

In yet other possible embodiments, the synchronization signals are generated by the receiver (of the sparse data signals) and transmitted from the receiver to the transmitter (of the sparse data signals).

Optionally, but in some embodiments preferably, the manipulating circuitry is implemented by an external fast serial logical XOR (exclusive OR) gate configured to mix the received sparse data signals with synchronization signals, and feed the mixed signal thereby generated to the receiver for clock regeneration (e.g., CDR frequency locking) and data speed (e.g., SerDes) conversion. The redundancy introduced to the received sparse data signals can be removed by a parallel logical XOR gate circuitry configured to mix the lower rate parallel (deserialized) mixed signal stream generated by the transceiver (SerDes) with respective parallel regenerated synchronization signal stream produced by the transceiver e.g., an internal PRBS loop controlled by the CDR of the transceiver to have the same frequency and periodicity of the clock signal of the transmitter.

In an alternative embodiment, instead of the external fast serial XOR logical gate, a first analog combiner circuitry is used to combine the received sparse data signals with the received synchronization signals, and feed a first combined signal thereby produced to a first transceiver channel for clock regeneration (e.g., by CDR frequency locking) and data speed (e.g., SerDes) conversion, a second analog combiner circuitry is used to combine the same received sparse data signals with an inverse (e.g., utilizing logical inverter/NOT circuitry) of the received synchronization signals and feed a second combined signal thereby generated to a second transceiver channel for clock regeneration (e.g., by CDR frequency locking) and data speed (e.g., SerDes) conversion. An internal logical XOR gate circuitry is used in each of the transceiver channels to perform an intermediate data recovery stage, by mixing the lower rate parallel signal stream produced by its data speed conversion with a corresponding parallel stream of the synchronization signals generated/emulated by its clock regenerator. The transmitted data can be then recovered by combining (e.g., utilizing a parallel logical OR gate circuit) the parallel mixed signal streams produced by the logical XOR gate circuitries of the first and second transceiver channels.

In order to accurately determine the time difference between the received sparse data signals and the synchronization signals, the recovered data transmission i.e., generated by the parallel logical XOR (or OR) gate circuitry, can be correlated with a predefined (known) data signal pattern. Optionally, the data signal pattern for the correlation with the recovered data stream is received in the receiver through another data channel (e.g., LAN). The correlation can be carried out in the transceiver, or by an external data processing (computer) system.

In possible embodiments the communication between the transmitter and receiver of the sparse data signals includes the following steps:

the receiver receives a predefined header generated by the transmitter over the synchronization signals channel and responsively activates a local synchronization signal source (e.g., clock generator/emulator, such as a PRBS generator/emulator) having the same periodicity of the transmitter's clock.

after transmitting the predefined header, the transmitter transmits its synchronization signals (e.g., PRBS clock signal used for the transmission of the sparse data signals) over the synchronization signal channel for some predetermined time interval required for the clock regenerator (CDR) of the transceiver used by the receiver for frequency locking. After the frequency locking the transceiver continuously compares the locally produced/emulated synchronization signals to the synchronization signals received over the synchronization signal channel to detect errors therein.

after the predetermined time interval allotted for frequency locking the transmitter introduces in the synchronization signals transmitted over the synchronization signal channel a predefined error pattern (e.g., 5 cycles of flipping 1 bit in every consecutive 128 clock bits transmission), thereby signalling the receiver that transmission of sparse data signals is about to start over the sparse data communication channel.

The receiver detects the predefined error patterns in the synchronization signals received over the synchronization signal channel, and responsively activates its sparse data signal detector, and sets an initial delay for sparse data signal receipt.

The receiver then continuously receives sparse data signals and synchronization signals from the transmitter, and determines accurate time difference between the received sparse data and synchronization signals by correlating at least some portion of the received sparse data signals with a predetermined (known) data signal pattern (e.g., received via another data channel).

The overlap between the synchronization signals and the sparse data signals is optimized by a tunable delay unit, with a sub-bit resolution e.g., by post processing data histogram configured for estimating the jitter of the sparse data signal and changing the delay to minimize the jitter, or alternatively for estimating the signal-to-noise SNR of the received sparse data signal and changing the delay to minimize the estimated SNR.

Optionally, but in some embodiments preferably, the sparse data communication channel is an optical channel (e.g., optical fiber or free space medium) used for transmission of quantum single-photon qubits. Accordingly, a single photon detector can be used at the receiver to convert the received sparse data optical signal into corresponding sparse data electrical signals. The synchronization signals communication channel can be implemented by a conventional data communication channel e.g., radio frequency—RF, over electrical cables or optical fibers. For example, and without being limiting, the synchronization signals communication channel can be implemented by an optical fiber, and the receiver can utilize a small form-factor pluggable (SFP) module to convert the received the optical synchronization signals into corresponding electrical signals.

One inventive aspect of the subject matter disclosed herein relates to a sparse data signal receiver comprising a mixer configured to generate a serial stream of mixed signals from a serial stream of sparse data signals and a serial stream of synchronization signals, to thereby add redundancy to the serial stream of sparse data signals and enable clock regeneration therefrom, a clock regeneration unit configured to receive the serial stream of mixed signals, determine based thereon a frequency of the synchronization signals, and generate a stream of parallel synchronization signals emulating the serial stream of synchronization signals, a data speed convertor configured to convert the serial stream of mixed signals into a stream of parallel mixed signals, the streams of parallel signals having a data rate lower than a data rate of the serial signal streams, and a demixer configured to generate a parallel stream of demixed signals from the stream of parallel synchronization signals and the stream of parallel mixed signals and thereby remove the redundancy introduced by the mixer into the sparse data signals. Optionally, but in some embodiments preferably, the synchronization signals comprise a pseudo random bit stream.

The serial stream of sparse data signals is received in some embodiments over a single-photon quantum communication channel. In such embodiments a single photon detector can be used to receive the serial stream of sparse data signals.

The regeneration unit and the data speed convertor can be implemented by clock-data recovery (CDR) circuitry and serializer-deserialize (SERDES) circuitry of at least one transceiver channel of a transceiver device. The at least one transceiver channel can be used to implement the demixer. The mixer can comprise a serial logical XOR gate circuitry and the demixer can comprise a parallel logical XOR gate circuitry. Optionally, the parallel logical XOR circuitry is implemented in the at least one transceiver channel of the transceiver device.

In possible embodiments the mixer can comprise a first analog combiner configured to generate a first serial combined signal from the serial streams of sparse data and synchronization signals, and a second analog combiner configured to generate a second serial combined signal from the serial stream of sparse data signals and an inverse of the serial stream of synchronization signals. The CDR, SERDES and parallel XOR gate, circuitries, of respective first and second transceiver channels of the transceiver can be configured to generate respective first and second streams of parallel demixed signals from the first and second combined signals. A parallel logical OR gate circuitry can be used to receive the first and second streams of parallel demixed signals from the first and second transceiver channels and remove the redundancy introduced by the mixer into the sparse data signals.

In other possible embodiments the mixer comprises a first analog combiner configured to generate a first serial combined signal from the serial streams of sparse data and synchronization signals, and a second analog combiner configured to generate a second serial combined signal from the serial stream of sparse data signals and an inverse of the serial stream of synchronization signals, and wherein SERDES circuitry of respective first and second transceiver channels of the transceiver are configured to generate respective first and second streams of parallel combined signals from the first and second serial combined signals. A parallel logical AND gate circuitry can be used to receive the first and second streams of parallel combined signals from the first and second transceiver channels and remove the redundancy introduced by the mixer into the sparse data signals.

A timing module is used in some embodiments to correlate at least a portion of the stream of parallel demixed signals with a predefined data signal pattern, and determine based thereon a time difference between the serial streams of sparse data and synchronization signals. The timing module can be configured and operable to identify missing bits in the PRBS of the serial synchronization signals stream based on the correlation, and correct the timing of the received serial synchronization signals stream accordingly.

The system comprises in some a service data communication channel. The predefined data signal pattern for the correlation can be received over the service data communication channel.

A tuneable time delay unit is used in some embodiments to affect a time delay to at least one of the serial streams of sparse data and synchronization signals based on the determined time difference.

In some embodiments the serial stream of synchronization signals is received over an optical communication channel. The system can comprise a small form-factor pluggable module configured to receive the serial stream of synchronization signals. Optionally, the optical communication channel comprises a dense wavelength division multiplexing (DWDM) channel. The transmitter can be configured in some embodiment to combine data signals with the synchronization signals transmitted over the DWDM channel.

Another inventive aspect of the subject matter disclose herein relates to communication system comprising the receiver system of any of the embodiments disclosed hereinabove or hereinbelow, a transmitter system comprising a data transmitter for transmitting the stream of sparse data signals, a synchronization signals generator configured to generate the serial stream of synchronization signals, and a synchronization signals transmitter for transmitting the serial stream of synchronization signal, a sparse data signals communication channel for transmitting the stream of sparse data signals to the receiver system, and a synchronization signals communication channel for transmitting the stream of synchronization signals to the receiver system.

The communication system comprises in some embodiments a service data channel for transmitting to the receiver system a data signal pattern for correlation with at least a portion of the stream of parallel demixed signals to thereby determine a time difference between the serial streams of sparse data and synchronization signals.

In some embodiments the communication system comprises an external synchronization system configured to generate the stream of synchronization signals and input the same to the receiver and/or the transmitter systems.

The communication system comprises in some embodiments a GPS clock configured to signal to the receiver and/or the transmitter commencement of transmission of the stream of sparse data signals.

In some possible embodiments the synchronization signals are generated by the receiver system and transmitted to the transmitter system over a synchronization channel (e.g., optical, or any other suitable conventional data communication channel). Optionally, but in some embodiments preferably, the synchronization signals transmitted by the receiver are combined with data signals.

In possible embodiments, the synchronization signals are transmitted by the receiver over a synchronization channel to a plurality of transmitters so as to synchronize transmission of sparse data signals from each one of the plurality of transmitters. In some applications, the synchronization signals are transmitted by the receiver over the synchronization channel combined with data signals to the plurality of transmitters. The additional data can comprise instructions configured to schedule transmission of sparse data signals from each one of the plurality of transmitters e.g., thereby allowing the receiver to receive the sparse data signals transmission from the plurality of transmitters utilizing a single data signal detector assembly (e.g., comprising one, two, or four single photon detectors).

Yet another inventive aspect of the subject matter disclosed herein relates to a method for synchronization of sparse data signals. The method comprising mixing a serial stream of sparse data signals with a serial stream of synchronization signals, to thereby add redundancy to the serial stream of sparse data signals and enable clock regeneration from a serial stream of mixed signals produced by the mixing, emulating the serial stream of synchronization signals by applying the clock regeneration to the serial stream of mixed signals, and generating a stream of parallel synchronization signals having a frequency of the serial stream of synchronization signals, deserializing the serial stream of mixed signals into a stream of parallel mixed signals having a data rate lower than a data rate of the serial signal streams, and demixing the stream of parallel synchronization signals with the stream of parallel mixed signals and thereby removing the redundancy introduced by the mixing into the sparse data signals and generating a parallel stream of demixed signals substantially synchronized with the synchronization signals.

The mixing comprises in some embodiments serially XORing the serial stream of sparse data signals with the serial stream of synchronization signals. The demixing comprises in some embodiments parallelly XORing the stream of parallel synchronization signals with the stream of parallel mixed signals.

In some embodiments the mixing comprises combining the serial streams of sparse data and synchronization signals and thereby generating a first stream of combined signals, combining the serial stream of sparse data signals and an inverse of the serial stream of synchronization signals and thereby generating a second stream of combined signals, emulating the serial stream of synchronization signals by applying the clock regeneration to the first and second streams of combined signals and generating respective first and second streams of parallel synchronization signals having a frequency of the serial stream of synchronization signals, deserializing the first and second streams of combined signals and generating respective first and second streams of parallel combined signals having a data rate lower than a data rate of the serial signal streams, demixing the first stream of parallel synchronization signals with the first stream of parallel combined signals and thereby generating a first stream of parallel demixed signals, demixing the second stream of parallel synchronization signals with the second stream of parallel combined signals and thereby generating a second stream of parallel demixed signals, and combining by logical OR the first and second streams of parallel demixed signals and thereby generating a stream of parallel demixed signals from which the redundancy added to the sparse data signal by the mixing is removed.

In some other possible embodiments the mixing comprises combining the serial streams of sparse data and synchronization signals and thereby generating a first stream of combined signals, combining the serial stream of sparse data signals and an inverse of the serial stream of synchronization signals and thereby generating a second stream of combined signals, deserializing the first and second streams of combined signals and generating respective first and second streams of parallel combined signals having a data rate lower than a data rate of the serial signal streams, and combining by logical AND the first and second streams of parallel combined signals and thereby generating a stream of parallel demixed signals from which the redundancy added to the sparse data signal by the mixing is removed.

The method can comprise correlating at least a portion of the stream of parallel demixed signals with a predefined data signal pattern, and determining based thereon a time difference between the serial streams of sparse data and synchronization signals.

The synchronization comprises in some embodiments a PRBS. The method can comprise identifying missing bits in the PRBS of the serial synchronization signals stream based on the correlation, and correcting the timing of the received serial synchronization signals stream accordingly. The method can further comprise affecting a delay time to at least one of the serial streams of sparse data and synchronization signals based on the determined time difference.

The method may comprise signalling to commencement of transmission of the stream of sparse data signals by a GPS clock.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which.

DETAILED DESCRIPTION OF EMBODIMENTS

Figure 1:
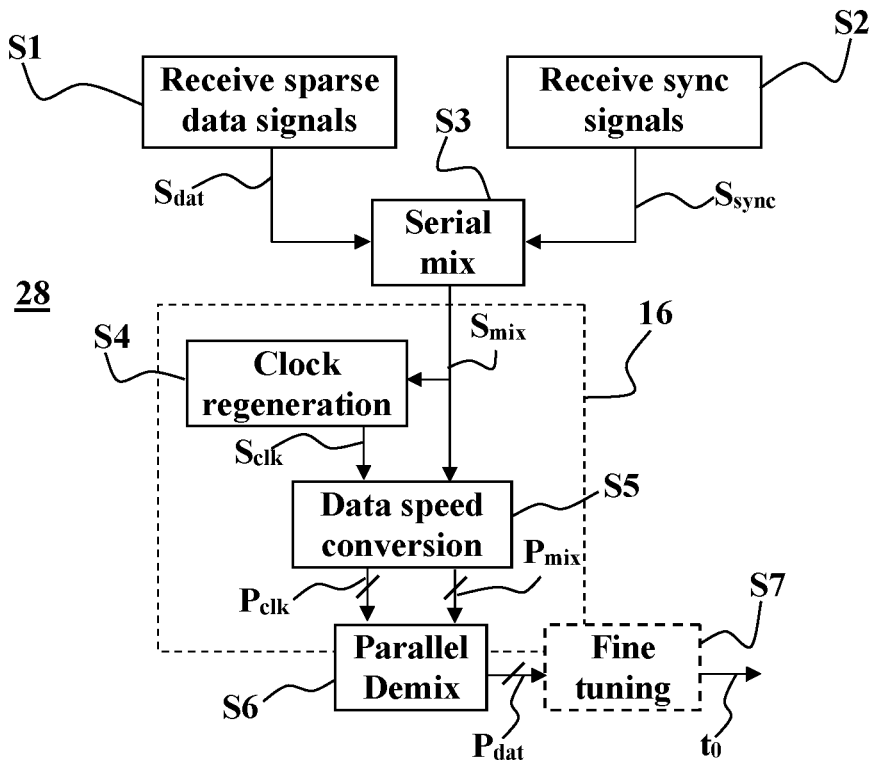
FIG. 1 is a flowchart schematically illustrating a sparse data signal communication technique according to some possible embodiments.

One or more specific and/or alternative embodiments of the present disclosure will be described below with reference to the drawings, which are to be considered in all aspects as illustrative only and not restrictive in any manner. It shall be apparent to one skilled in the art that these embodiments may be practiced without such specific details. In an effort to provide a concise description of these embodiments, not all features or details of an actual implementation are described at length in the specification. Emphasis instead being placed upon clearly illustrating the principles of the invention such that persons skilled in the art will be able to make and use the sparse data communication techniques, once they understand the principles of the subject matter disclosed herein. This invention may be provided in other specific forms and embodiments without departing from the essential characteristics described herein.

Sparse data communication methods and systems are disclosed, that exploit functionalities of standard transceiver devices for synchronization and time measurement of sparse events, which thus enables implementing the sparse data communication techniques hereof utilizing readily available/nonspecialized circuitries. In order to exploit the clock regeneration (e.g., clock data recovery—CDR) feature of a standard transceiver, incoming data signals received over a sparse data communication channel are mixed in a preliminary stage with a stream of synchronization signals received over a standard (classical) communication channel. This way, the sparsity of data signals received over the sparse data communication channel is substantially diminished, and redundancy is reversibly introduced thereinto. The mixed signal obtained is fed to a conventional transceiver for clock regeneration and data speed conversion (e.g., SERDES).

The redundancy introduced into the received sparse data signals enables the transceiver to regenerate/emulate the synchronization (clock) signal used by the transmitter of the sparse data signals, and to synchronize accordingly its data speed conversion functionality. The data speed conversion of the transceiver can be configured to receive a serial stream of the mixed signal and convert it into a lower rate parallel data signal stream. The transmitted data can be then recovered by demixing the lower rate parallel data signal stream with a respective lower rate parallel signals stream of the synchronization signal regenerated/emulated by the transceiver.

Optionally, but in some embodiments preferably, fine tuning can be performed by correlating at least some portion of the recovered lower rate parallel data signal stream with a predetermined data signal pattern agreed upon with the transmitter, to enable determining at the receiver exact time of arrival of each sparse data signal received therein. The demixing and/or fine tuning of the lower rate parallel data signals stream can be carried out by the transceiver, or by an external signal/data processing device.

In some embodiments the synchronization signals comprises a clock signal of the transmitter, or of another external clock signal source indicative of the clock signal of the transmitter. Optionally, but in some embodiments preferably, the synchronization signals comprises a pseudorandom binary sequence (PRBS) clock signal of the transmitter, or of an external clock signal source indicative of the clock signal of the transmitter.

The mixer is implemented in some embodiments by a logical XOR (exclusive OR) gate circuitry configured to mix a serial stream of the data signals received over the sparse data communication channel with a serial stream of the synchronization signals received over the conventional data channel. In such embodiments the demixer can be implemented by a parallel logical XOR gate circuitry configured to demix the lower rate parallel data signals stream with the lower rate parallel synchronization signals stream of the regenerated/emulated synchronization signal.

In an alternative embodiment the mixer is implemented utilizing a first and second analog combining circuitries (hereinafter referred to as combiners), and two respective transceiver devices/channels are used for the clock regeneration and the data speed conversion. Each of the analog combiners can be configured to implement a logical OR functionality (herein after referred to as combining), using the synchronization signal for introducing a suitable degree of reversible redundancy into the received sparse data signals. In a possible embodiment the first analog combiner is configured to combine the received sparse data signals with the received synchronization signals, and the second analog combiner is configured to combine the received sparse data signals with an inverse of the received synchronization signals (e.g., after passing through an analog logical inversion/NOT gate circuitry). Each of the first and second transceiver devices/channels is configured to carry out clock regeneration and data speed conversion for the combined signal received therein from its respective analog combiner, and an intermediate data recovery stage utilizing a logical XOR gate circuitry to demix the lower rate parallel data signals stream thereby produced with the lower rate parallel synchronization signals stream of the synchronization signal thereby regenerated/emulated. The transmitted data can be then recovered by a logical parallel OR gate circuitry configured to combine the lower rate parallel data signals streams from the logical XOR gate circuitries of the first and second transceiver devices/channels. A fine tuning step can be thereafter performed to the combined lower rate parallel data signals stream produced by the logical parallel OR gate circuitry, in a similar fashion as described hereinabove and hereinbelow.

In possible embodiments the data recovery is carried out without the intermediate data recovery stage by the logical XOR gate circuitries of the first and second transceiver devices/channels. In such possible embodiments the data recovery is carried out utilizing a logical parallel AND circuitry configured to operate on the lower rate parallel data signals streams produced by the first and second transceiver devices/channels. A fine tuning step can be thereafter performed to the lower rate parallel data signal stream produced by logical parallel AND gate circuitry, in a similar fashion as described hereinabove and hereinbelow.

For an overview of several example features, process stages, and principles of the invention, the sparse data communication examples illustrated schematically and diagrammatically in the figures are intended for single-photon quantum data communication system. These single-photon quantum data communication systems are shown as one example implementation that demonstrates a number of features, processes, and principles used to provide reliable and stable sparse data communication applications, but they are also useful for other applications and can be made in different variations (e.g., RF data communication). Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in sparse data communication applications may be suitably employed, and are intended to fall within the scope of this application.

FIG. 1 shows a flowchart 28 schematically illustrating a sparse data communication process according to some possible embodiments. The process starts in simultaneous receipt of a serial stream of sparse data signals $S_{dat}$ over a sparse data communication channel (e.g., single-photon quantum communication) in step S1, and of a serial stream of synchronization signals $S_{sync}$ over a conventional communication channel (e.g., RF, electric cables, fiber optic, etc.) in step S2. The serial sparse data signals stream $S_{dat}$ and the synchronization signals stream $S_{sync}$ are mixed in step S3 to increase redundancy of the serial sparse data signals stream. The mixed serial signals stream $S_{mix}$ having the increased redundancy is used in step S4 for clock regeneration/emulation (e.g., using CDR circuitry) whereby a serial clock signals stream $S_{clk}$ is generated. The serial clock signals stream $S_{clk}$ generated/emulated in the clock regeneration step S4 substantially has the same frequency and periodicity of the clock signal used for the transmission of the serial stream of sparse data signals $S_{dat}$. Optionally, but in some embodiments preferably, the clock signal used for the transmission of the serial stream of sparse data signals $S_{dat}$ is a PRBS having a predefined monic polynomial and seed value.

In step S5 data speed conversion (e.g., using SERDES circuitry) is performed to produce a lower rate parallel mixed signals stream $P_{mix}$ from the serial mixed signals stream $S_{mix}$ produced in step S3, and to produce a lower rate parallel clock signals stream $P_{clk}$ from the regenerated/emulated serial clock signals stream $S_{clk}$, produced in step S4. Optionally, but in some embodiments preferably, the steps S4 and S5 are performed utilizing CDR and SERDES functionalities of a conventional transceiver device 16.

The lower rate parallel mixed data and clock signals streams, $P_{mix}$ and $P_{clk}$ respectively, produced in step S5 are demixed in step S6 to remove the redundancy introduced into the serial sparse data signals stream $S_{dat}$ from the lower rate parallel mixed data signals stream $P_{mix}$. A fine tuning step S7 is optionally performed for accurately registering the demixed lower rate parallel data signals stream $P_{dat}$ with respect to clock signal used for the transmission of the serial stream of sparse data signals $S_{dat}$. The fine tuning step S7 may comprise correlating at least a portion of the lower rate parallel data signals stream $P_{dat}$ with a predetermined data pattern to determine the exact time of arrival $t_0$ of the first sparse data signal over the sparse data channel. The predetermined data pattern used for the correlation may be stored in advance in a memory of the system, or provided to the receiver over a conventional data communication channel from the transmitter, or another external source. The parallel demix step S6, and/or the fine tuning step S7, can be also carried out in the transceiver device 16, or by an external data processing device.

Figure 2:
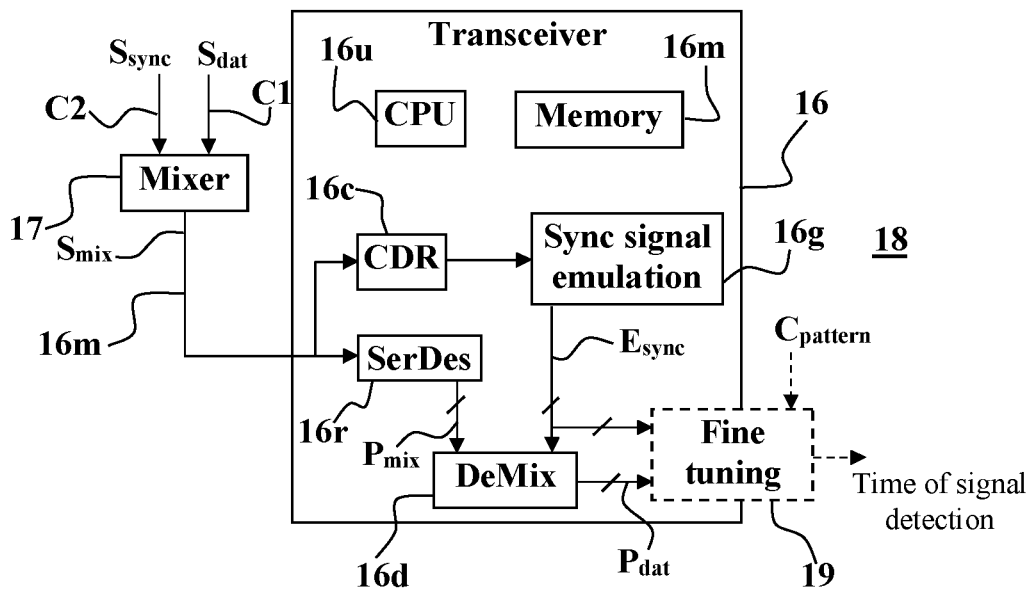
FIG. 2 is a block diagram schematically illustrating utilization of a conventional transceiver for sparse data communication according to some possible embodiments.

FIG. 2 is a block diagram schematically illustrating a sparse data receiver apparatus 18 according to some possible embodiments. The receiver apparatus 18 is configured to receive a serial sparse data signals stream $S_{dat}$ over a sparse data communication channel C1 (e.g., single-photon quantum communication), and a serial stream of synchronization signals $S_{sync}$ over a conventional communication channel C2 (e.g., RF, optical fiber, electric cables). The received serial sparse data signals stream $S_{dat}$ and the synchronization signals stream $S_{sync}$ are mixed by mixer 17, configured to use the serial sparse synchronization signals stream $S_{sync}$ to increase the redundancy of the serial sparse data signals stream $S_{dat}$. The mixed serial data signals stream $S_{mix}$ produced by the mixer 17 is fed to a transceiver device 16 for clock regeneration and data speed conversion.

Particularly, the CDR circuitry 16c of the transceiver device 16 is exploited to recover from the mixed serial data signals stream $S_{mix}$ the frequency of the clock signal used to transmit the serial sparse data signals stream $S_{dat}$, and its SERDES functionality is exploited to convert (deserialize) the data speed of the mixed serial data signals stream $S_{mix}$ into a lower rate parallel mixed data signals stream $P_{mix}$. The clock frequency recovered by the CDR circuitry 16c is used for operating the synchronization signal emulation circuitry 16g which is configured to generate the lower rate emulated parallel synchronization signals stream $E_{sync}$ used for synchronizing the internal components of the transceiver 16. In possible embodiments the synchronization signal emulation circuitry 16g comprises clock generator circuitry (not shown) having the same frequency and periodicity of the clock signals used for the transmission of the serial sparse data signals stream $S_{dat}$. If this transmission of clock signals is a PRBS, then the clock generator circuitry of the synchronization signal emulation circuitry 16g is configured to use the predefined monic polynomial and seed value of the transmitters PRBS clock.

The demixer circuitry 16d is used for demixing the lower rate parallel mixed data signals stream $P_{mix}$ with the lower rate emulated parallel synchronization signals stream $E_{sync}$, and thereby remove the redundancy introduced by the mixer 17 into the serial sparse data signals stream $S_{dat}$. Optionally, a fine tuning module 19 is used to accurately register the lower rate parallel data signals stream $P_{dat}$ produced by the demixer 16d with respect to the clock signal used to transmitting the serial sparse data signals stream $S_{dat}$. The fine tuning module 19 is configured and operable to use the lower rate emulated parallel synchronization signals stream $E_{sync}$ for correlating the lower rate parallel data signals stream $P_{dat}$ produced by the demixer 16d with a predetermined (or externally supplied) data pattern C and based pattern, thereon determined the exact time of arrival of the first sparse data signal over the sparse data communication channel C1, with respect to the clock signal used for transmitting the same. The fine tuning module (also referred to herein as a timing module) 19 can be implemented by one or more processors 16u and memories 16m of the transceiver device 16, or by an external data processing device or circuitry.

Figure 3:
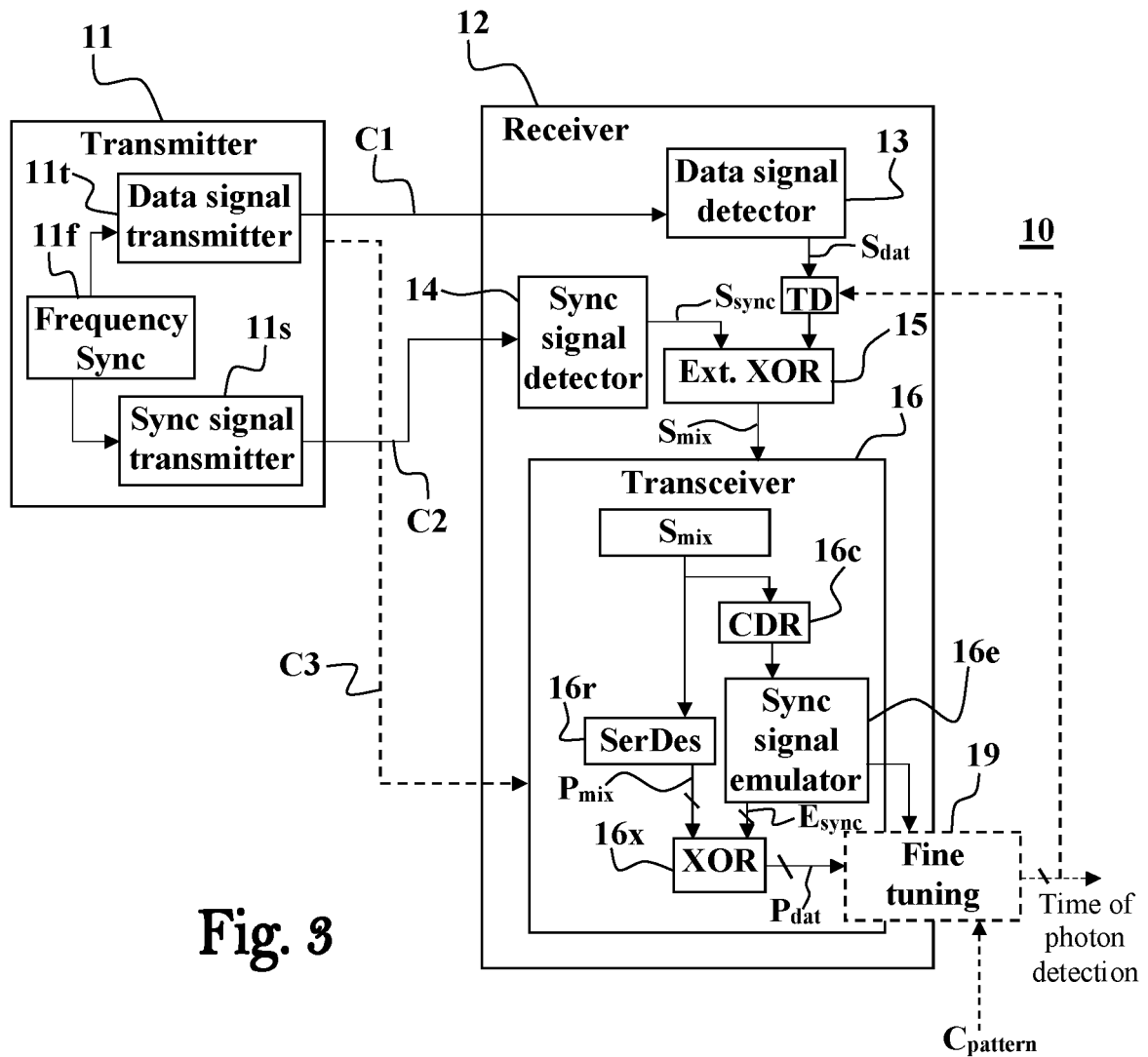
FIG. 3 is a block diagram schematically illustrating a communication system according to some embodiments utilizing a single conventional transceiver.

FIG. 3 schematically illustrates a sparse data communication system 10 according to some possible embodiments, comprising a transmitter (Tx) 11 and a receiver (Rx) 12 configured to communicate over two separate communication channels, C1 and C2 (e.g., optical, RF, or electrical). The transmission on both communication channels is from the transmitter 11 to the receiver 12. The communication channel (data line) C1 is used to transmit serial sparse data signals (e.g., single-photon quantum communication), and the communication channel C2 (synchronization line) is used to transmit serial synchronization signals (e.g., clock signals transmitted over a conventional data communication channel (e.g., optical fiber, electric cables, RF).

The two communication channels, C1 and C2, are synchronized at the transmitter 11 by synchronization signals generated by its internal frequency synchronization circuitry (e.g., clock signal generator) 11f. Optionally, but in some embodiments preferably, the serial synchronization signals produced by the frequency synchronization circuitry 11f comprises a PRBS clock operating in in an infinite loop. The transmitter comprises a data signal transmitter 11t configured to transmit data signals over the sparse data communication channel C1, and a synchronization signal transmitter configured to transmit the synchronization signals generated by the frequency synchronization circuitry 11f over the synchronization signals communication channel C2. The distance between the transmitter 11 and the receiver 12 is not limited by the communication protocol disclosed herein.

At the receiver 12, a data signal detector 13 is used to receive the serial data signals stream transmitted over the sparse data signals communication channel C1, and a synchronization signal detector 14 is used to receive the serial synchronization signals transmitted over the synchronization signals channel C2. In some embodiments the data and/or synchronization signals channels, C1 and/or C2, are optical channels, and in such embodiments the data signals detector 13 and the synchronization signals detector 14 are configured to convert the optical signals received over these channels into corresponding electrical signals.

For example, but without being limiting, the synchronization signals channel C2 can be implemented by one or more optical fibers, and the serial synchronization signals transmitted thereover can be converted from optical to electrical signals $S_{sync}$ by an SFP module of the data signal detector 13. The synchronization signals can comprise a known, balanced periodic digital clock signal, such as 01010101 . . . (period of 2), or a PRBS having longer period and generated utilizing a predefined monic polynomial and seed value. In some embodiments the data channel C1 is a sparse single-photon quantum communication channel (e.g., implemented by optical fiber(s) or free space medium), and in such embodiments the data signal detector 13 can utilize optoelectronic measuring instruments, such as a single photon detector (e.g., avalanche photodiode), to convert the single-photon (qubits) signals transmitted thereover into corresponding electric signals $S_{dat}$. The receiver 12 is required to determine the accurate timing of the data signals received therein over the sparse data signals communication channel C1.

In this specific and non-limiting example the electric synchronization signals $S_{sync}$ and the electric sparse data signals $S_{dat}$ are mixed together by a logical XOR gate circuit 15, which can be implemented by an external dedicated high speed circuit e.g., such as HMC745 manufactured by Analog Devices capable of operating with data rates of up to 13 Gbps. This way, the sparsity of the electric sparse data signals $S_{dat}$ is substantially reduced, such that the redundancy of the mixed signal $S_{mix}$ generated by the serial logical XOR gate circuit 15 is suitable for use with a conventional transceiver device 16. A tuneable delay unit TD can be used to align the data ($S_{dat}$) and synchronization ($S_{sync}$) signals in time, for accurate bit signals overlap, as will be explained below. In this non-limiting example the tuneable delay unit TD is used for controllably affecting a delay to the serial data signal stream $S_{dat}$, but in possible embodiments it can be similarly used to delay the synchronization signals $S_{sync}$.

The mixed signal $S_{mix}$ produced by the serial logical XOR gate circuit 15 is fed into the conventional transceiver device 16, for synchronization and processing. The frequency of the mixed signal $S_{mix}$ is recovered by the CDR circuitry 16c of the transceiver 16. The frequency recovered by the CDR circuitry 16c is used by the synchronization signal emulator 16e to generate local synchronization signals for the components of the transceiver device 16. Accordingly, if the synchronization signals source 11f of the transmitter comprises PRBS signals, the synchronization signal emulator 16e is configured to generate PRBS signals having the same frequency and periodicity, monic polynomial and seed value, of the PRBS signals used at the transmitter 11.

A frame counter (not shown) can be used in some embodiments to count the bits since the beginning of the transmission. The frame counter can be configured to count the number of frames, which comprises 64 bit words of a PRBS clock of the synchronization signal emulator 16e. In a possible embodiment a PRBS loop counter having an odd length is implemented in the synchronization signal emulator 16e by a 64 bits PRBS clock generator e.g., a PRBS7 having a 127 bits length, so every 64 bit word (loop) is not a whole PRBS loop and may contain bits from more than one PRBS loops which are counted by the frame counter.

The mixed signal $S_{mix}$ produced by the logical XOR gate circuit 15 is simultaneously deserialized by the SERDES circuitry 16r of the transceiver device 16, which generates a lower rate parallel (deserialized) mixed signal stream $P_{mix}$. The synchronization signal emulator 16e is configured to produce a corresponding lower rate parallel (deserialized) signals stream of the synchronization signals $E_{sync}$. The transceiver device 16 can be configured to compare to lower rate parallel (deserialized) mixed ($P_{mix}$) and synchronization ($E_{sync}$) signals, and identify the sparse data signal as an error in the received synchronization signal (e.g., PRBS pattern). The parity error bits produced by the logical XOR gate circuitry 15 of the lower rate parallel (deserialized) mixed signals ($P_{mix}$) and the index of the frame counter provides the timing of the event relative to the beginning of the transmittance of the synchronization signals over the synchronization signals channel C2.

An internal parallel logical XOR gate circuit 16x of the transceiver device 16 can be used to demix the lower rate parallel (deserialized) mixed signals stream $P_{mix}$ with the lower rate parallel (deserialized) synchronization signals $E_{sync}$, and thereby remove the redundancy introduced into the serial data signal stream $S_{dat}$ by the serial logical XOR gate circuit 15. The fine tuning module 19 can be similarly used to accurately register the lower rate parallel data stream $P_{dat}$ produced by the internal parallel logical XOR gate circuit 16x with respect to the synchronization signals of the transmitter 11, by correlating at least a portion of the lower rate parallel data signals stream $P_{dat}$ with the predefined/known data pattern $C_{pattern}$, as described hereinabove. The timing data determined by the fine tuning module 19 can be used to set the delay time affected by the tuneable delay unit TD. For example, an additional conventional service/communication channel (e.g., LAN/ETHERNET) C3 can be used in the system 10 as a data channel for receiving data for post-process correlation ($C_{pattern}$) and error estimation i.e., this data is not essentially pre-determined and known to the receiver 12.

Figure 4:
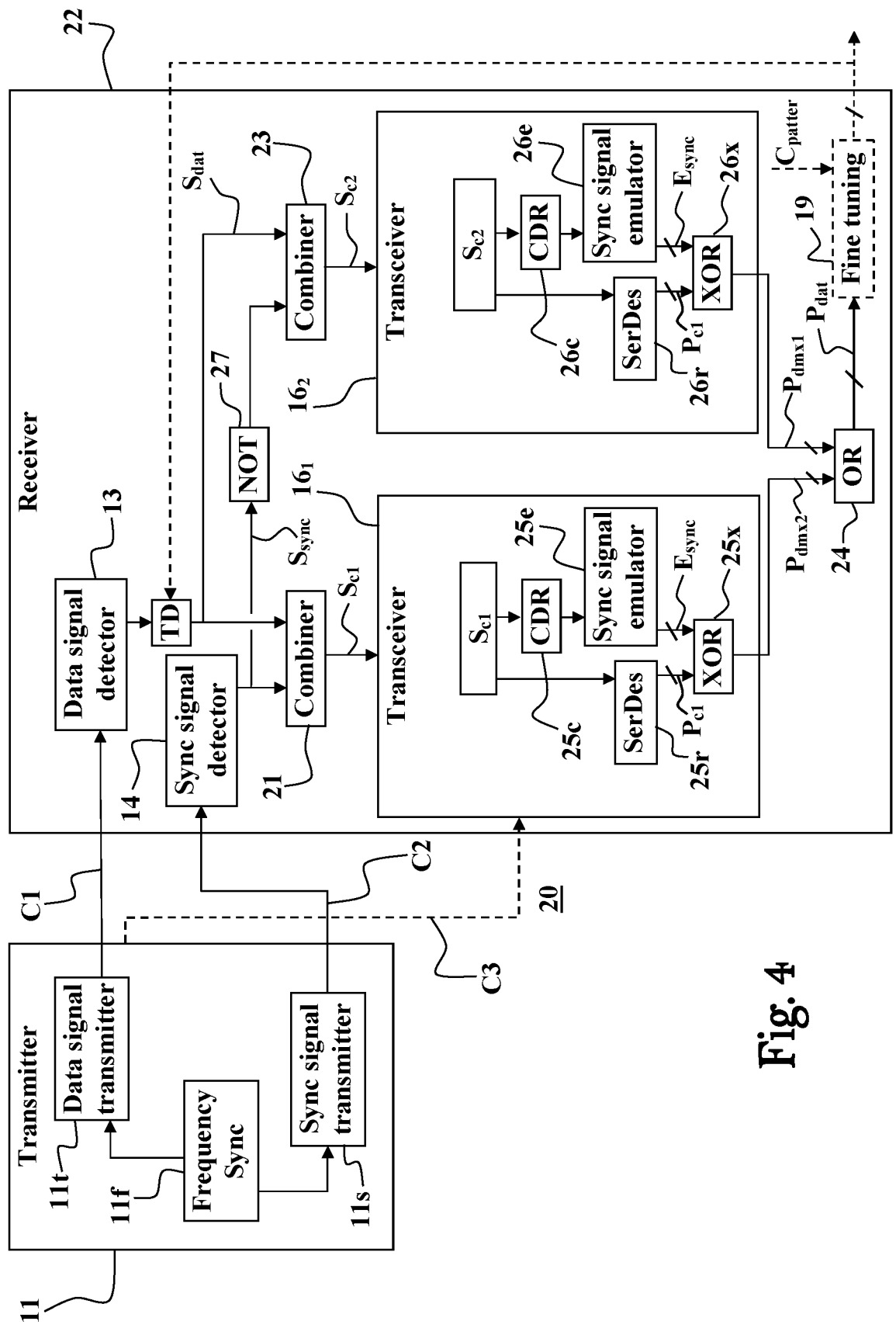
FIG. 4 is a block diagram schematically illustrating a communication system according to some possible embodiments utilizing two conventional transceivers.

FIG. 4 schematically illustrates a sparse data communication system 20 according to other possible embodiments. Some of the components of communication system 20 are similar to those of the communication system 10 of FIG. 3, and thus designated by the same reference numerals. The main differences between the communication systems 10 and 20 is in the mixing and demixing of the data and synchronization signals, and in using two separate transceiver devices/channels at the receiver 22 for the synchronization and processing. The mixing performed at the receiver 22 utilizes first and second analog combiner circuitries, 21 and 23, each configured to perform a logical OR operation to electrical signals thereby received for adding reversible redundancy to the sparse data signal $S_{dat}$. The first combiner 21 is configured to combine the synchronization signals $S_{sync}$ from the synchronization signal detector 14 with the sparse data signals $S_{dat}$ from the data signal detector 13, and the second combiner 23 is configured to combine the synchronization signals $S_{sync}$ inversed by the analog NOT/inversion circuitry 27 with the sparse data signals $S_{dat}$. The combined signals, $S_{c1}$ and $S_{c2}$, produced by the first and second combiners, 21 and 23, are fed into respective first and second transceiver devices/channels, $16_1$ and $16_2$, for synchronization and processing.

Each of the first and second transceivers, $16_1$ and $16_2$, perform the clock regeneration and data speed conversion as performed by transceiver 16 of FIG. 3, and explained hereinabove. Accordingly, each of the first and second transceivers $16_1$,$16_2$ comprises a respective CDR circuitry 25c,26c synchronization signal emulator 25e,26e SERDES circuitry 25r,26r and logical XOR gate circuitry 25x,26x configured to generate a respective demixed lower rate parallel data signals streams $P_{dmx1}$,$P_{dmx2}$. The demixed lower rate parallel data signals streams, $P_{dmx1}$ and $P_{dmx2}$, are combined by a parallel logical OR gate circuitry 24 to thereby produce the lower rate parallel data stream $P_{dat}$ from which the redundancy added by the analog combiner circuitries, 21 and 23, to the sparse data signals $S_{dat}$ is removed. The fine tuning module 19 can be similarly used to accurately register the lower rate parallel data signals stream $P_{dat}$ produced by the parallel logical OR gate circuitry 24 by correlating at least a portion of the lower rate parallel data stream $P_{dat}$ with data pattern $C_{pattern}$, which may be alternatively transmitted to the receiver 12 over the conventional/service channel C3, as described hereinabove. The timing data determined by the fine tuning module 19 can be used to set the delay time affected by the tuneable delay unit TD.

Figure 5:
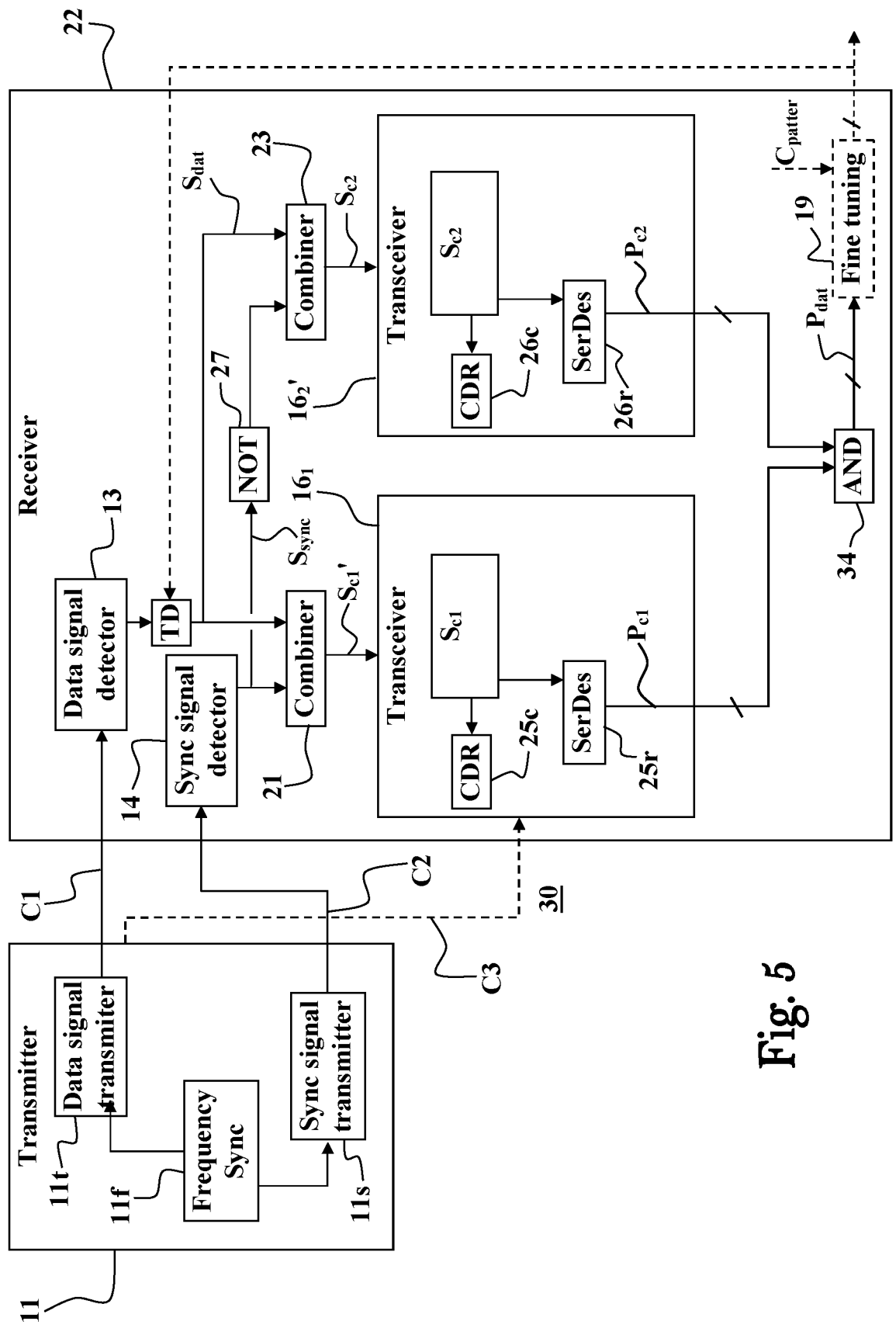
FIG. 5 is a block diagram schematically illustrating another possible embodiment for a communication system utilizing two conventional transceivers.

FIG. 5 schematically illustrates a sparse data communication system 30 according to yet other possible embodiments. Some of the components of communication system 30 are similar to those of the communication system 20 of FIG. 4, and thus designated by the same reference numerals. The main differences between the communication systems 20 and 30 is that the removal of the redundancy from receive data signal is carried out by a parallel logical AND circuitry 34 configured to operate on the lower rate parallel (deserialized) combined signals streams, $P_{c1}$ and $P_{c2}$, produced by the SERDES circuitry, 25r and 26r of the transceiver devices, $16_1$' and $16_2$'. The transceiver devices $16_1$',$16_2$' therefore don't require the synchronization signal emulators 25e,26e and XOR circuitries 25x,26x of the transceiver devices $16_1$,$16_2$ shown in FIG. 4.

The fine tuning module 19 can be similarly used to accurately register the lower rate parallel data signals stream $P_{dat}$ produced by the parallel logical AND gate circuitry 34 by correlating at least a portion of the lower rate parallel data signals stream $P_{dat}$ with predefined/know data pattern $C_{pattern}$, which may be alternatively transmitted to the receiver 12 over the conventional/service channel C3, as described hereinabove. The timing data determined by the fine tuning module 19 can be used to set the delay time affected by the tuneable delay unit TD.

It is noted that the use of PRBS in synchronization signals is advantageous over a 50% clock cycle signal (i.e., having period of 2). Particularly, if there are missing bits in the serial synchronization signals stream received over the synchronization signals channel C2, the receiver device/channel 12 can be configured to identify how many bits are missing, and correct the timing of the received serial synchronization signals stream e.g., based on the known monic polynomial and seed value of the PRBS. For example, but without being limiting, the SERDES mechanism can be configured to apply the required corrections.

The transceiver devices/channels shown in FIGS. 2 to 4 can be implemented by commercially available transceiver devices e.g., Intel (Altera) FPGAs such as Cyclone10, Arria10 and Stratix10. The transceiver(s) used in the disclosed embodiments comprises one or more processors (CPUs 16u) and memories (16m, shown in FIG. 2) configured and operable to carry out various procedures/functions and control schemes e.g., signal processing and error analysis, fine tuning correlation. As explained hereinabove, the CDR and SERDES functionalities of these transceivers can be exploited to recover the time and data of transmitted sparse data signals, per specific timing resolution and data rate of the transceiver selected for the implementation (e.g., 25 Gbps, allowing 40 ps resolution). The inventors hereof tested the sparse data signals communication techniques disclosed herein utilizing remote transmitter-receiver setups with satisfactory results.

In some embodiments the streams of combined signals generated by the analog combiners circuitries, 21 and 23, in FIGS. 4 and 5 are passed through analog level repairing circuitry (not shown) configured to adjust their analog levels so as to correct the digital levels of the combined signals thereby generated.

Figure 6:
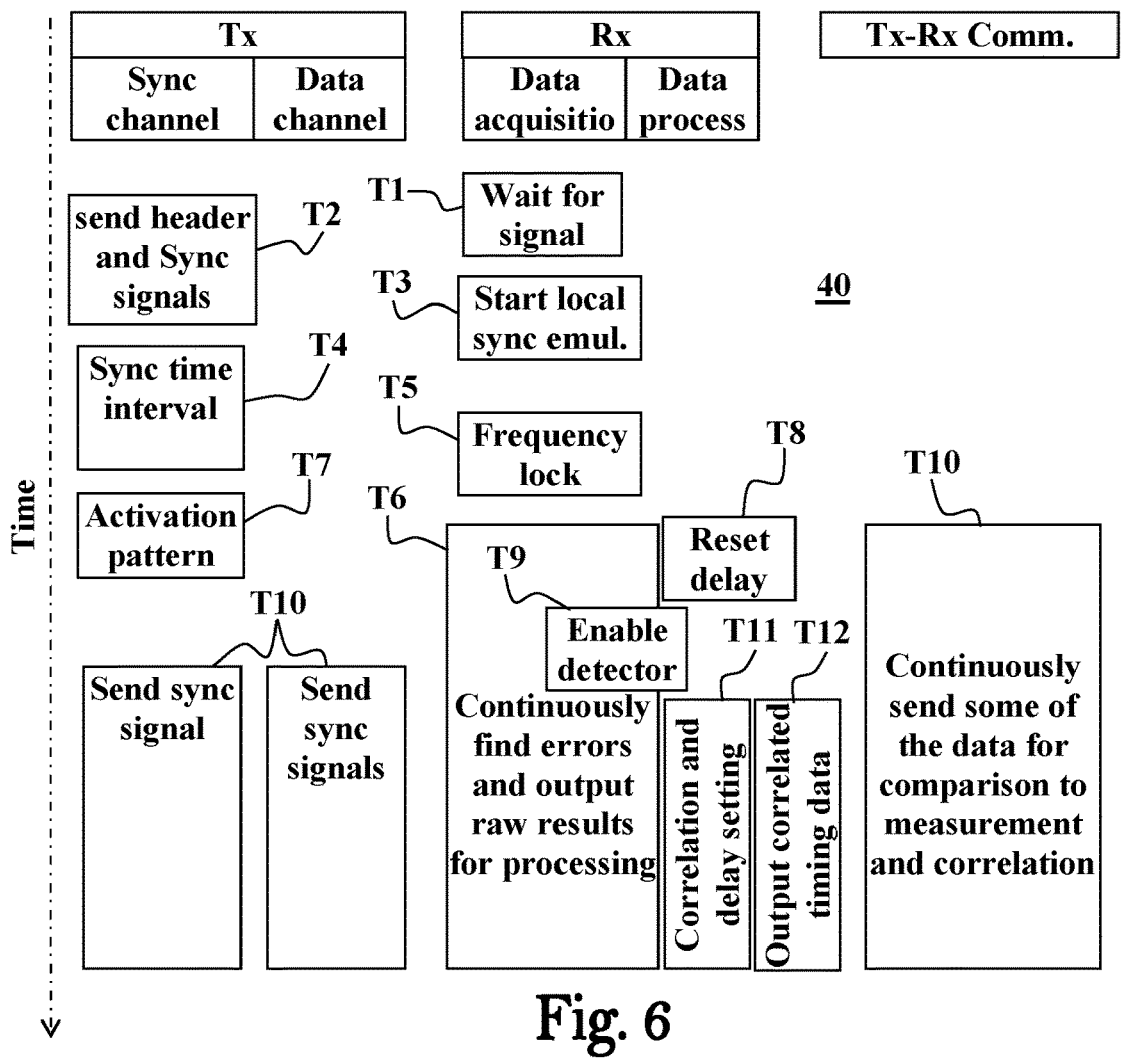
FIG. 6 is a flow diagram demonstrating a timing process in the communication system according to possible embodiments.

FIG. 6 shows a flow diagram demonstrating a timing process 40 in the transmitter (Tx), the receiver (Rx), and between the transmitter and the receiver (Tx-Rx Comm.) in the sparse data communication systems according to possible embodiments. At the end of the process 40 the sparse data communication system is synchronized, and continuously optimizes the accuracy of the synchronization signal emulation unit of the transceiver device(s)/channel(s).

On startup (T1 e.g., power up) the receiver (Rx) waits for arrival of synchronization signals from the transmitter (Tx) over the synchronization signals channel (C2). At this stage the data signal detector (13) is disabled, to allow proper reception of a header of the synchronization (e.g., PRBS) signals. Any predetermined signal patterns can be used for the header transmitted over the synchronization signals channel e.g., a sequence of 1,0,1,0,1,0, . . . having a predefined length.

Whenever transmission is commenced, the transmitter (Tx) transmits the header signals over the synchronization signals channel (C2), followed by the synchronization signals (T2). The receiver (Rx) receives the header over the synchronization signals channel (C2), and thereafter activates the synchronization signal emulator (T3) (e.g., a local clock signal source, having the timing and periodicity (and polynomial and seed value if a PRBS is used) of the synchronization signals of the transmitter (Tx). The transmitter (Tx) can be configured to continuously transmit the synchronization signals (T4) over the synchronization signals channel (C2) for some predetermined time interval (e.g., 1 us) required for the CDR circuitry of the receiver's transceiver to recover and lock to the frequency of the synchronization signals received over the synchronization signals channel (C2).

Once frequency recovery and locking of the CDR circuitry of the receiver's transceiver is completed (T5), the synchronization signal source of the transmitter (Tx) and the synchronization signals emulator of the transceiver of the receiver (Rx) are operating at the same frequency. At this stage the transceiver of the receiver (Rx) continuously compares the synchronization signals received over the synchronization signals channel (C2) to the synchronization signals produced by its synchronization signals emulator to identify errors in the received synchronization signals and utilise the identified errors to extract timing information from the time slot of the errors. The timing information extracted from the time slots of the errors can be used to recover the sparse data received over the sparse data communication channel (C1), as these errors are introduced by the mixer (e.g., logical XOR gate) by mixing of the sparse data signals with the synchronization signals (e.g., PRBS).

After the predetermined time interval for transmitting the synchronization signals, the transmitter (Tx) introduces into the synchronization signals thereby transmitted a predefined (error) pattern (T7) that the transceiver(s) of the receiver (Rx) is configured to identify, for example, by flipping a predefined number of bits in the synchronization signals e.g., flipping 1 bit every 128 bits of the synchronization signal, for 5 times. After the transceiver(s) of the receiver (Rx) identifies the predefined (error) pattern introduced by the transmitter (Tx), it sets the tuneable delay (TD) unit (T8) to an initial delay thereby determined between the synchronization signals and the data signals, and activates (T9) the data signals receiver (13).

The transmitter (Tx) then continuously transmits the synchronization and the data signals (T10), over the data signals channel (C1) and the synchronization signals channel (C2), respectively. Optionally, but in some embodiments preferably, some of the data transmitted over the data signal channel (C1) is known to receiver (Rx) e.g., a predefined pattern, or a data signal pattern communicated to the receiver over a different communication channel. The receiver (Rx) correlates (T10) the received data signals to the known/predefined data signal pattern, and based thereon accurately determines the delay time between the received synchronization and data signals (training), used for setting the tuneable delay (TD) unit. This training procedure can be carried out periodically, or intermittently, to compensate for drifts between the timing of the synchronization and data signals, and for maintaining the accurate delay time between the synchronization and data signals, so the synchronization between transmitter (Tx) and the receiver (Rx) is not lost. The receiver (Rx) can be configured to continuously identify time instances in which errors occurred in the demixed signals, and/or the synchronization signals, and/or electrical serial data signal stream (T12), and carry out necessary corrections based thereon. The corrected times can be used as the system output e.g., to another process/device.

For example, in possible embodiments wherein time-bin encoding is used, the photon arrival time holds the data carried by the photon. The recovery of the data carried by the received photon (time→bit value) is recovered in some embodiments in a post process (e.g., by an external data processing system, such as a personal computer—PC, embedded system, another FPGA block etc).

In some embodiments the delay time is calculated for blocks of sparse data signals, which is accurate only on average. Some of the parameters causing the delay time between the synchronization and data channels are physical, such as temperature of optical fibers and electronic components, which changes on a time scale of many seconds. If the variation of the delay is slow enough compared to the timescale of delay drift estimation, an interpolation and extrapolation of the delay time between measured time delays can be performed. This can be done both online, before outputting the recovered data signals, or offline, after data The recovered data is outputted. The simplest kind of interpolation and extrapolation is linear, but more sophisticated filters and estimators can be applied, depending on the drift pattern and mechanism.

The mixing (e.g., by logical XOR gate circuitry) of data streams transmitted over two different communication channels with the same clock signal frequency is optimal when the phase (inter-bit delay) is optimal. This would make the timing resolution close to 1 bit (limited by the accuracy and jitter of other components of the system, such as the single photon detector). A phase of ½ bit will lower the resolution closer to 2 bits. The tuneable delay (TD) unit can be used in either the data or the synchronization channel (or both channels) to get a zero (0) phase between the synchronization and data signals channels. One way to optimize the phase between these communication channels is to tune the delay from 0 to 1 bit, and analyse the events with a constant duration e.g., by estimating the jitter of the sparse data signal and changing the delay to minimize the jitter, or by estimating the SNR of the received signal and changing the delay to minimize it, as described herein above. The optimum is achieved when the event duration used is minimal.

Figure 7:
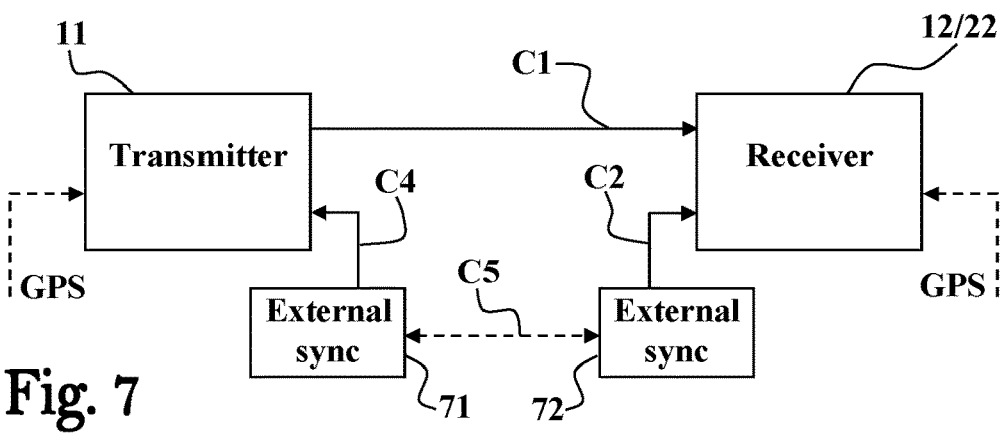
FIG. 7 is a block diagram demonstrating a communication system according to some embodiments utilizing external synchronization system.

The communication systems disclosed herein can be configured to receive synchronization signals at the transmitter (Tx) and/or the receiver (Rx) from an external time synchronization system, as exemplified in FIG. 7. In this non-limiting example the transmitter 11 is operated by an external synchronization system 71, operated in synchronization with an external synchronization system 72 that operates the receiver 12 (or 22). The synchronization between the external synchronization systems, 71 and 72, can be carried out over a conventional data communication channel C5. Accordingly, in such embodiments the receiver 12 (or 22) receives its synchronization signals over the conventional communication channel C2 from the external synchronization system 72, and the transmitter 11 receives its synchronization signals over the conventional communication channel C24 from the external synchronization system 71.

For example, in a 10 Gbps communication network a synchronized of 10.3 Gbps clock can be recovered from user data e.g., CDR can be performed on optical signal taken form a tap to the optical channel used by other network users, located at both the transmitting and receiving sides, or from service channels, C4 and C2, provided at both the transmitting and receiving sides. If a different communication frequency is required, this signal can be used as the input for a clock generating system (not shown), with the required clock, at both the transmitter 11 and the receiver 12/22, which gives the correct operation frequency to the participating parties. The receiver 12/22 can be configured to locally generate the required clock signal (e.g., PRBS) and mix (e.g., by logical XOR gate circuitry) it with the internal detection system signal to be measured using the transceiver. For example, if the required operational frequency of the system is 10 Gbps, and 10.3 Gbps signals are recovered from the network, the signals are recovered with an SFP, and converted from the 10.3 Gbps to 10.0 Gbps rate using a PLL. On the transmitter side data signals will be sent with this frequency, and on the receiver side a serial electronic 10 Gbps PRBS clock signal will be generated and streamed to the serial XOR gate circuitry, to be combined with the sparse date signal from the single photon detector.

The external synchronization system, 71 and 72, can be used to synchronize time counters provide in the transmitter 11 and the receiver 12/22, to record the time of events, where the transmission can have a different frequency. The delay time between transmitter 11 and the receiver 12/22 is initially found by correlation of the received sparse data signal to a predefined data signal pattern e.g., transmitted to the receiver over a conventional/service communication data channel. A communication channel with a known maximal latency can be used to indicate to the transmitter 11 to start transmitting data, and indicate to the receiver 12/22 to wait for incoming sparse data signals. After the maximal latency is reached, the transmitter 11 starts transmitting the predefined data signal pattern used for the correlation. The delay between transmitter 11 and the receiver 12/22 is the time difference of optimal correlation. From this point the system will continue to periodically optimize the delay time.

FIG. 7 further demonstrates use of a GPS clock for signaling the initial timing t0 for synchronization in sparse data communication according to possible embodiments. The sparse data communication techniques disclosed herein, with or without a dedicated synchronization signals communication channel, can be applied to one transmitter transmitting to any number of receivers, by splitting the synchronization and data signals, or by generating numerous synchronized synchronization and data signals. The process of setting the frequency, delay and phase would work independently for each receiver.

The sparse data communication techniques disclosed herein can be utilized to communicate sparse data signal from multiple transmitters to a single receiver, by combining the sent sparse data signals before detection. The sparse data communication techniques utilizing the synchronization signals communication channel can be applied by sending and splitting the synchronization signal from the receiver to all transmitters, such that the transmitters receive the synchronization signals and locks the sparse data transmission signals to the received CDR. This will ensure that the frequency is the same for the receiver and all of the transmitters. Finding the delay time between the data and internal synchronization signals of the receiver can be done in the receiver, separately for each transmitter.

Figure 8:
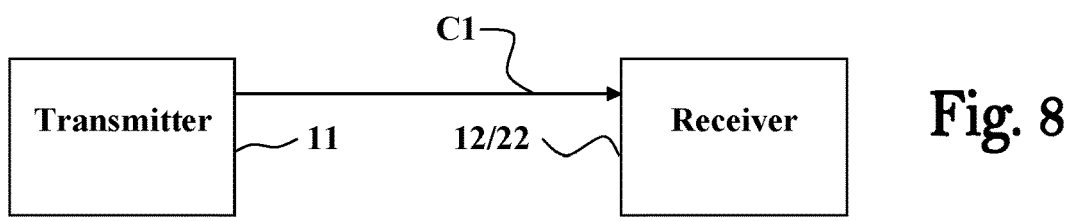
FIG. 8 is a block diagram demonstrating a communication system according to some embodiments operating without synchronization signals communication channel.
Figure 9:
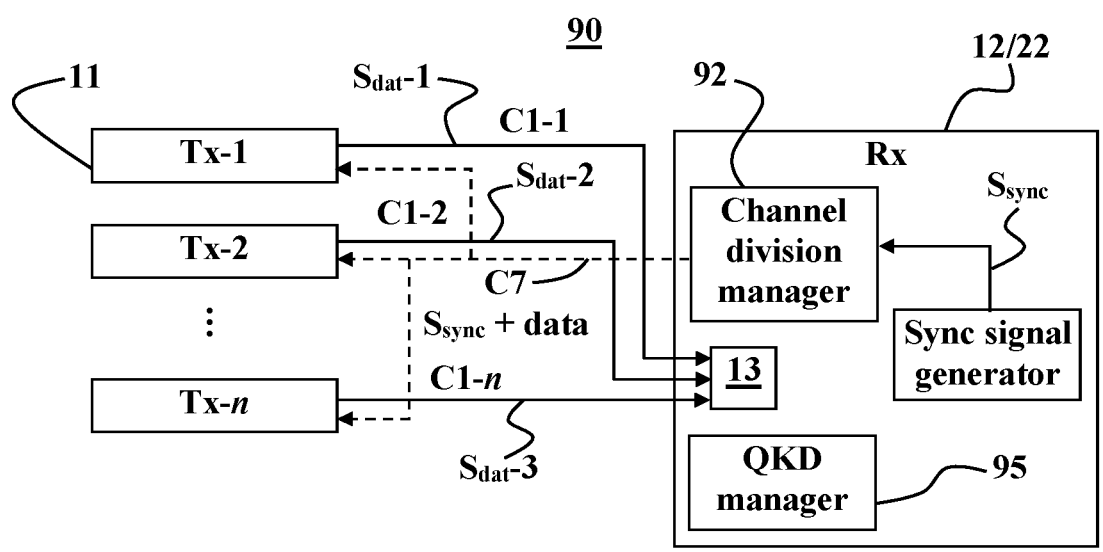
FIG. 9 is a block diagram schematically a communication system according to other possible embodiments.

In possible embodiments, wherein the drift of the synchronization and data signals channels is slow enough comparing to the data rate, the synchronization signals can be recovered as post process, without requiring the synchronization signals channel (C2), as exemplified in FIG. 8. By utilizing a known/predefined data signal pattern for correlation, and high enough data rate, the frequency and delay time can be recovered in post process of the data using only the sparse data signals, using fitting to a model or to a polynom, for example. FIG. 9 is a block diagram schematically illustrating a communication system 90 according to possible embodiments, where the synchronization signals $S_{sync}$ are generated by the receiver (Rx), 12 or 22, according to any of the embodiments disclosed herein, and transmitted to one or more transmitters (Tx) 11 over the synchronization channel C7 (e.g., conventional data communication channel—presented by dashed arrowed line). As exemplified in FIG. 9, the in some embodiments the receiver 12/22 is configured to synchronize the communication with a plurality of transmitters Tx-1, Tx-2, . . . , Tx-n (collectively referred to herein as transmitters Tx-i, where n>0 and i≤n are integer numbers). This way, a single receiver 12/22 can be used to synchronize a plurality sparse data communications/signals $S_{dat}$-1, $S_{dat}$-2, . . . , $S_{dat}$-n received from a respective plurality of transmitters Tx-1, Tx-2, . . . , Tx-n over a respective plurality of sparse data communication channels C1-1, C1-2, . . . , C1-n.

Optionally, but in some embodiments preferably the receiver 12/22 is further configured to transmit additional data to the transmitters Tx-i over the synchronization channel C7, together with the synchronization signals $S_{sync}$.

The channel division manager unit 92 is configured in some embodiments to encode in the additional data transmitted over the synchronization channel C7 information for managing the operation of the plurality of the transmitters Tx-1, Tx-2, . . . , Tx-n. Optionally, but in some embodiments preferably, the channel division manager unit 92 is configured and operable to encode in the additional data transmitted over the synchronization channel C7 information (synchronization instructions) configured for scheduling the transmission of the sparse data signals $S_{dat}$-1, $S_{dat}$-2, . . . , $S_{dat}$-n by each one of the plurality of the transmitters Tx-1, Tx-2, . . . , Tx-n to the receiver 12/22 e.g., using time division multiplexing or round robin techniques.

Accordingly, in this configuration the receiver 12/22 can synchronize the plurality of transmitters Tx-1, Tx-2, . . . , Tx-n to the same communication frequency of the system 90 by the synchronization signals $S_{sync}$ transmitted over the synchronization channel C7, and also to schedule the sparse data signals/communications $S_{dat}$-1, $S_{dat}$-2, . . . , $S_{dat}$-n transmitted by each one of the plurality of the transmitters Tx-1, Tx-2, . . . , Tx-n by means of the additional data also transmitted over the synchronization channel C7. This way time division multiplexing (TDM) techniques can be used in the receiver 12/22 to synchronize and receive the plurality of sparse data signals/communications $S_{dat}$-1, $S_{dat}$-2, . . . , $S_{dat}$-n utilizing a single data signal detector assembly 13 (e.g., comprising one, two or four, single photon detectors), as exemplified in FIG. 9.

Optionally, but in some embodiments preferably, the channel division manager unit 92 is configured to repeatedly/periodically use the same synchronization bit sequence of the synchronization signals $S_{sync}$, and encode the additional data (e.g., synchronization instructions) thereinto by flipping (i.e., inverting) one or more of the bits of the synchronization signals $S_{sync}$. The plurality of the transmitters Tx-1, Tx-2, . . . , Tx-n can accordingly use parallel XOR gates (such as XOR gate 16x in FIG. 3) to detect the information encoded by the channel division manager unit 92 in the synchronization signals $S_{sync}$ (assuming a predefined/known synchronization sequence is use).

The receiver 12/22 comprises in some embodiments a QKD manger unit 95 configured to manage QKD procedures between the receiver 12/22 and each one of the transmitters Tx-i. This way, the receiver 12/22 can manage generation of QKD encryption keys with a plurality transmitters Tx-i over a single synchronization channel C7 and utilizing a single data signal detector 13.

The synchronization signals channel comprises in some embodiments an optical channel, a dense wavelength division multiplexing (DWDM) channel for example, which normally transmits no data. In the direction opposite to the direction of synchronization signals transmission, data can be simply sent using circulators. Sending data in the direction of synchronization signals requires more effort. Data can be sent over this channel by flipping the synchronization signals bits (e.g., by XORing the data with the synchronization PRBS signals before serializing the synchronization signals and transmitting them). To have a clear separation between the received data signal (coming from detectors) and data sent over the synchronization signals channel, it is possible to calibrate the system for time sharing between signals coming from the sparse signals detector and signals coming from the synchronization signals channel.

One possible method, applicable for short optical links (low latency links, usually below 1 km) would be to use the detector dead time, which can be over 90% of the time. The receiver can inform the transmitter when no data is expected and data over the synchronization channel is allowed. Another possible method, which can work for any link length is as follows: After the receiver (Rx) estimates accurately the delay time between the data synchronization signals channels, it informs transmitter (Tx) which bits are signal free, and can be used to transmit data. The delay for the transmitter (Tx) is given relative to the known pattern (e.g., the 5 bit flips) sent before the beginning of the communication.

It should also be understood that throughout this disclosure, where a process or method is shown or described, the steps of the method may be performed in any order or simultaneously, unless it is clear from the context that one step depends on another being performed first. It is also noted that terms such as first, second, . . . etc. may be used to refer to specific elements disclosed herein without limiting, but rather to distinguish between the disclosed elements.

Those of skill in the art would appreciate that items such as the various illustrative blocks, modules, elements, components, methods, operations, steps, and algorithms described herein may be implemented as hardware or a combination of hardware and computer software. To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

Features of the disclosed embodiments can be implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s).

As described hereinabove and shown in the associated FIGS., the present invention provides communication techniques of sparse data signals and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A sparse data signal receiver system comprising: a mixer configured to generate a serial stream of mixed signals from a serial stream of sparse data signals and a serial stream of synchronization signals, to thereby add redundancy to said serial stream of sparse data signals and enable clock regeneration therefrom; a clock regeneration unit configured to operate on said serial stream of mixed signals; a data speed convertor configured to convert said serial stream of mixed signals into a stream of parallel mixed signals; and a demixer configured to remove the redundancy introduced by said mixer into said sparse data signals, characterized in that said serial stream of synchronization signals comprising a pseudo random binary sequence (PRBS), and said clock regeneration unit configured to determine a frequency of said serial stream of synchronization signals comprising said PRBS, said system further comprising a synchronization signal emulation unit configured to: generate a PRBS signal having the frequency determined by said clock regeneration unit and periodicity of said PRBS; and produce a corresponding stream of parallel synchronization signals emulating said serial stream of synchronization signals comprising the PRBS and synchronized therewith, and said demixer configured to generate a parallel stream of demixed signals from said stream of parallel synchronization signals having the determined frequency and the PRBS periodicity and said stream of parallel mixed signals.

2. The system of claim 1 comprising a quantum communication channel and a photon detector coupled thereto for generation of said serial stream of sparse data signals.

3. The system of claim 1 wherein the stream of parallel synchronization signals is generated by the emulation unit based on monic polynomial and seed of the pseudo random bit stream of the serial stream of synchronization signals.

4. The system of claim 1 wherein the clock regeneration unit and the data speed convertor are implemented by respective clock-data recovery (CDR) circuitry and serializer-deserialize (SERDES) circuitry of at least one transceiver channel of a transceiver device.

5. The system of claim 4 wherein the at least one transceiver channel of the transceiver device is configured to implement the demixer.

6. The system of claim 1 wherein the mixer comprises a serial logical XOR gate circuitry and the demixer comprises a parallel logical XOR gate circuitry.

7. The system of claim 6 wherein the parallel logical XOR circuitry is implemented in the at least one transceiver channel of the transceiver device.

8. The system of claim 7 wherein the mixer comprises a first analog combiner configured to generate a first serial combined signal from the serial streams of sparse data and synchronization signals, and a second analog combiner configured to generate a second serial combined signal from the serial stream of sparse data signals and an inverse of the serial stream of synchronization signals, and wherein the data speed convertor is configured to generate first and second streams of parallel signals from said first and second combined signals.

9. The system of claim 8 wherein the demixer is configured to generate respective first and second parallel streams of demixed signals from said respective first and second streams of parallel signals and said stream of parallel mixed signals, and wherein said demixer comprising a parallel logical OR gate circuitry configured to operate on the first and second streams of parallel demixed signals and remove the redundancy introduced by said mixer into said sparse data signals.

10. The system of claim 7 wherein the mixer comprises a first analog combiner configured to generate a first serial combined signal from the serial streams of sparse data and synchronization signals, and a second analog combiner configured to generate a second serial combined signal from the serial stream of sparse data signals and an inverse of the serial stream of synchronization signals, and wherein the data speed convertor is configured to generate first and second streams of parallel combined signals from said first and second serial combined signals.

11. The system of claim 10 comprising a parallel logical AND gate circuitry configured to operate on the first and second streams of parallel combined signals from the data speed convertor and remove the redundancy introduced by said mixer into said sparse data signals.

12. The system of claim 1 comprising a timing module configured to correlate at least a portion of the stream of parallel demixed signals with a predefined data signal pattern, and determine based thereon a time difference between the serial streams of sparse data and synchronization signals.

13. The system of claim 1 configured to identify missing bits in the PRBS of the serial synchronization signals stream and correct the received serial synchronization signals stream accordingly.

14. The system of claim 12 comprising a service data communication channel, and wherein the predefined data signal pattern for the correlation is received over said service data communication channel.

15. The system of claim 12 comprising a tuneable time delay unit configured to affect a time delay to at least one of the serial streams of sparse data and synchronization signals based on the determined time difference.

16. The system of claim 1 comprising an optical communication channel and a small form-factor pluggable module coupled thereto and configured to receive said serial stream of synchronization signals thereover.

17. The system of claim 16 wherein the optical communication channel comprises a dense wavelength division multiplexing (DWDM) channel configured to combine data signals with the synchronization signals transmitted over said DWDM channel.

18. A communication system comprising:
the receiver system according to claim 1;
a transmitter system comprising a data transmitter for transmitting the stream of sparse data signals, a synchronization signals generator configured to generate the serial stream of synchronization signals comprising the PRBS, and a synchronization signals transmitter for transmitting the serial stream of synchronization signal;
a sparse data signals communication channel for transmitting said stream of sparse data signals to said receiver system; and
a synchronization signals communication channel for transmitting said stream of synchronization signals comprising the PRBS to said receiver system.

19. The system of claim 18 comprising a service data channel for transmitting to the receiver system a data signal pattern for correlation with at least a portion of the stream of parallel demixed signals to thereby determine a time difference between the serial streams of sparse data and synchronization signals.

20. The system of claim 18 comprising an external synchronization system configured to generate the stream of synchronization signals and input the same to the receiver and/or the transmitter systems.

21. The system of claim 18 comprising a GPS clock configured to signal to the receiver and/or the transmitter commencement of transmission of the stream of sparse data signals.

22. A method for synchronization of sparse data signals, the method comprising: mixing a serial stream of sparse data signals with a serial stream of synchronization signals, to thereby add redundancy to said serial stream of sparse data signals and enable clock regeneration from a serial stream of mixed signals produced by said mixing; deserializing said serial stream of mixed signals into a stream of parallel mixed signals; and demixing said stream of parallel synchronization signals to remove the redundancy introduced by said mixing into said sparse data signals,
characterized in that said serial stream of synchronization signals comprising a PRBS, and the method comprising:
determining a frequency of said serial stream of synchronization signals by applying clock regeneration to said serial stream of mixed signals;
generating a stream of parallel synchronization signals emulating said serial stream of synchronization signals comprising the PRBS, said stream of parallel synchronization signals having a periodicity of said PRBS and the determined frequency of said serial stream of synchronization signals and it is synchronized with said serial stream of synchronization signals; and
demixing said stream of parallel synchronization signals having the determined frequency and the periodicity of the PRBS with said stream of parallel mixed signals.

23. The method of claim 22 wherein the mixing comprises serially XORing the serial stream of sparse data signals with the serial stream of synchronization signals having the PRBS, and the demixing comprises parallelly XORing the stream of parallel synchronization signals having the determined frequency and the PRBS periodicity with the stream of parallel mixed signals.

24. The method of claim 22 wherein the mixing comprises combining the serial streams of sparse data and synchronization signals and thereby generating a first stream of combined signals, combining the serial stream of sparse data signals and an inverse of the serial stream of synchronization signals and thereby generating a second stream of combined signals, the determining comprises determining a frequency of said first and second streams of combined signals, the generating comprises generating respective first and second streams of parallel synchronization signals having the determined frequency and the PRBS periodicity of said serial stream of synchronization signals and synchronized with said serial stream of synchronization signals, the deserializing comprises deserializing said first and second streams of combined signals and generating respective first and second streams of parallel combined signals having a data rate lower than a data rate of said serial signal streams, the demixing comprises demixing said first stream of parallel synchronization signals having the determined frequency and the PRBS periodicity of said serial stream of synchronization signals with said first stream of parallel combined signals and thereby generating a first stream of parallel demixed signals, and demixing said second stream of parallel synchronization signals having the determined frequency and the PRBS periodicity of said serial stream of synchronization signals with said second stream of parallel combined signals and thereby generating a second stream of parallel demixed signals, and wherein the method comprises combining by logical OR said first and second streams of parallel demixed signals and thereby generating a stream of parallel demixed signals from which the redundancy added to the sparse data signal by the mixing is removed.

25. The method of claim 22 wherein the mixing comprises combining the serial streams of sparse data and synchronization signals and thereby generating a first stream of combined signals, combining the serial stream of sparse data signals and an inverse of the serial stream of synchronization signals and thereby generating a second stream of combined signals, and wherein the deserializing comprises deserializing said first and second streams of combined signals and generating respective first and second streams of parallel combined signals having a data rate lower than a data rate of said serial signal streams, and wherein the demixing comprises combining by logical AND said first and second streams of parallel combined signals and thereby generating a stream of parallel demixed signals from which the redundancy added to the sparse data signal by the mixing is removed.

26. The method of claim 22 comprising correlating at least a portion of the stream of parallel demixed signals with a predefined data signal pattern, and determining based thereon a time difference between the serial streams of sparse data and synchronization signals.

27. The method of claim 22 comprising identifying missing bits in the serial synchronization signals stream, and how many bits are missing, and correcting the timing of the received serial synchronization signals stream accordingly.

28. The method of claim 27 comprising affecting a delay time to at least one of the serial streams of sparse data and synchronization signals based on the determined time difference.

29. The method of claim 22 comprising signalling the commencement of transmission of the stream of sparse data signals by a GPS clock.

30. The method of claim 22 comprising generating of the stream of parallel synchronization signals based on monic polynomial and seed of the PRBS of the serial stream of synchronization signals.

31. The system of claim 18 wherein the synchronization signals are generated by the receiver system and transmitted to the transmitter system.

32. The system of claim 18 wherein synchronization signals are received over an optical channel and combined with data signals.

33. The system of claim 31 wherein the synchronization signals are transmitted over a synchronization channel combined with data signals.

34. The system of claim 31 wherein the synchronization signals are transmitted by the receiver over a synchronization channel to a plurality of transmitters, to synchronize transmission of sparse data signals from each one of said plurality of transmitters.

35. The system of claim 31 wherein the synchronization signals are transmitted by the receiver over the synchronization channel combined with data signals to the plurality of transmitters, and wherein said additional data comprises instructions configured to schedule transmission of the sparse data signals from each one of said plurality of transmitters.

* * * * *